(12) United States Patent
Kauppinen (10) Patent No.: US 7,737,403 B2
(45) Date of Patent: Jun. 15, 2010

(54) DETECTOR ARRANGEMENT FOR ELECTROMAGNETIC RADIATION AND METHOD FOR MEASURING ELECTROMAGNETIC RADIATION

(75) Inventor: Jyrki Kauppinen, Ilmarinen (FI)

(73) Assignee: Noveltech Solutions Ltd, Turku (FI)

( * ) Notice: Subject to any disclaimer, the term of this patent is extended or adjusted under 35 U.S.C. 154(b) by 0 days.

(21) Appl. No.: 12/212,412

(22) Filed: Sep. 17, 2008

(65) Prior Publication Data

US 2009/0072147 A1 Mar. 19, 2009

(30) Foreign Application Priority Data

Sep. 18, 2007 (FI) .................................. 20070713

(51) Int. Cl.
*G01J 5/02* (2006.01)
(52) U.S. Cl. .................................. 250/341.1
(58) Field of Classification Search .............. 250/341.1, 250/338.3, 340, 339.13, 239, 227.19, 227.27, 250/35.5
See application file for complete search history.

(56) References Cited

U.S. PATENT DOCUMENTS

| | | | | |
|---|---|---|---|---|
| 4,634,870 | A | * | 1/1987 | Metcalf ...................... 250/332 |
| 6,008,898 | A | * | 12/1999 | Furstenau et al. ........... 356/519 |
| 7,045,784 | B1 | | 5/2006 | Ptasinski et al. |
| 7,208,737 | B2 | | 4/2007 | Kauppinen |
| 2007/0022804 | A1 | * | 2/2007 | Kley .......................... 73/105 |
| 2007/0045541 | A1 | * | 3/2007 | Urey et al. ................ 250/338.3 |

FOREIGN PATENT DOCUMENTS

| | | |
|---|---|---|
| EP | 0893675 B1 | 10/2003 |
| JP | 8-184501 A | 7/1996 |
| WO | 2004/029594 A1 | 4/2004 |

OTHER PUBLICATIONS

"Direct-View Uncooled Micro-Optomechanical Infrared Camera", Mao et al.,Technical Digest. IEEE International MEMS 99 Conference. Twelfth IEEE International Conference on Micro Electro Mechanical Systems, 1999, pp. 100-105.

"Novel Far Infrared Imaging Sensor Based on the Use of Titanium-Nickel Shape Memory Alloys" Ho et al., Proceedings of the SPIE—The International Society for Optical Engineering, 2002, pp. 69-73.

"Extremely sensitive CWA analyzer based on a novel optical pressure sensor in photoacoustic gas analysis", Jyrki Kauppinen et al., Invited Paper, Optically Based and Chemical Sensing for Defence, edited by John C. Carrano, Arturas Zukauskas, Proceedings of SPIE vol. 5617, 2004.

(Continued)

*Primary Examiner*—David P Porta
*Assistant Examiner*—Faye Boosalis
(74) *Attorney, Agent, or Firm*—Stiennon & Stiennon (57) ABSTRACT

A detector arrangement for electromagnetic radiation has at least an absorbing element and a cantilever sensor which are in operational connection with each other, so that the sensor is bendable in response to electromagnetic radiation absorbed by the absorbing element. The arrangement further includes an interferometer for measuring bending of the cantilever sensor. In a method for measuring electromagnetic radiation, electromagnetic radiation is directed on to the absorbing element and thereby bending of the cantilever sensor is caused. Bending of the cantilever sensor is measured with an interferometer. The cantilever sensor can be a door-like flap made of silicon, attached to one side of a frame of silicon.

10 Claims, 6 Drawing Sheets

OTHER PUBLICATIONS

"Photoacoustic Spectroscopy in Trace Gas Monitoring", Frans J.M. Harren et al., in Encyclopedia of Analytical Chemistry, R.A. Meyers (Ed.) pp. 2203-2226, © John Wiley & Sons Ltd, Chichester, 2000.

"Light and sound—photoacoustic spectroscopy", C. Haisch and R. Niessner, pp. 10-15, Spectroscopy Europe 14/5 (2002).

Search Report issued in FI 20070713.

* cited by examiner

DETECTOR ARRANGEMENT FOR ELECTROMAGNETIC RADIATION AND METHOD FOR MEASURING ELECTROMAGNETIC RADIATION

CROSS REFERENCES TO RELATED APPLICATIONS

This application claims priority on Finnish Application No. 20070713, filed Sep. 18, 2007, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention relates to a detector arrangement for electromagnetic radiation comprising at least an absorbing element and a sensor arranged in operational connection with each other and at least the sensor being arranged to be bendable in response to electromagnetic radiation.

This invention relates further to a method for measuring electromagnetic radiation. In the method an absorbing element and a sensor are arranged in operational connection with each other. Electromagnetic radiation is directed on to the absorbing element whereby a bending of the sensor is caused. Bending of the sensor is measured.

A detector for electromagnetic radiation is a detector that reacts to electromagnetic radiation.

Prior art comprises several types of detectors for electromagnetic radiation: Thermocouples and thermopiles use the thermoelectric effect. Typically, they have a large thermal mass, long response times and rather limited sensitivity.

Bolometers are based on changes in resistance. Conventional bolometer structures have large thermal mass. By using micro-machined, suspended foils mass can be reduced and rise time shortened.

Solid-state detectors for electromagnetic radiation, such as quantum well devices, are based on semiconductor phenomena. As a consequence of their high inherent thermal noise, these devices must generally operate at a reduced temperature. Their spectral response is also severely limited by the intrinsic properties of the semiconductor materials.

The currently fastest and still quite sensitive bolometers are based on superconductors, which are voltage or current-biased into the transient-edge of the superconductive material. These devices, however, are workable only in cryogenic temperatures well below 1 K.

Golay cells follow thermal expansion. Gas inside a chamber expands upon heating and causes a Mylar-film to deform. Golay cells are sensitive, but very delicate.

Patent publication EP 0 893 675 B1 discloses a luminous intensity sensor element having a flat disk-shaped element made of material with a high thermal expansion coefficient and of low thermal conductivity and on opposite faces, an optically absorbent layer and a reflecting layer. On receiving excitation radiation, the optically absorbent layer is heated and transmits heat to the disk-shaped element, which is heated internally in spatially non-uniform manner and is deformed together with the superimposed reflecting layer. The reflecting layer receives an incident reference light beam to generate a reflected light beam having optical characteristics depending on the aforementioned deformation and varying in response to the excitation radiation. The structure of the sensor element is fairly complicated with three different layers. The sensor element is a membrane and therefore it is fastened by all of its edges which restricts its movements and weakens linearity.

SUMMARY OF THE INVENTION

An object of the invention is to eliminate or alleviate at least some of the above-mentioned problems of the prior art.

Another object of the invention is to provide a detector for electromagnetic radiation with high sensitivity, wide dynamic range and stable and highly linear response.

The embodiment examples and advantages mentioned in this text relate in suitable parts both to the detector arrangement and the method according to the invention even if this is not always expressly mentioned.

A typical detector arrangement for electromagnetic radiation according to the invention comprises at least an absorbing element for absorbing optical energy of electromagnetic radiation, and a sensor. The absorbing element and the sensor are arranged in operational connection with each other and at least the sensor is arranged to be bendable in response to electromagnetic radiation absorbed by the absorbing element. The arrangement further comprises an interferometer for measuring bending of the sensor, which is a cantilever.

A typical method according to the invention for measuring electromagnetic radiation comprises the following steps:
  arranging an absorbing element and a sensor in operational connection with each other, and at least the sensor to be bendable in response to electromagnetic radiation,
  directing electromagnetic radiation on to the absorbing element and thereby causing a bending of the sensor, and
  measuring bending of the cantilever type sensor with an interferometer.

According to a preferred embodiment of the invention the detector arrangement and the method are especially suitable for measuring infrared radiation. They are also suitable for measuring UV radiation and visible light.

According to a preferred embodiment of the invention the detector arrangement comprises a Michelson type interferometer, which comprises at least a light source, a reference mirror, a beam splitter and at least two detectors. Bending of the sensor can then be measured with the Michelson type interferometer, the measuring comprising at least the following steps:
  generating a light beam by the light source,
  splitting the light beam for the reflecting surface of the sensor and for the reference mirror by the beam splitter and reflecting the split beams from the sensor and the reference mirror back to the beam splitter, and further to at least two detectors, and
  receiving the light beams coming from the sensor and the reference mirror via the beam splitter and converting the received beams into electric signals by the detectors.

The reflecting surface of the sensor corresponds to a moving mirror of a typical Michelson interferometer. An advantage of using Michelson interferometer is e.g. very high accuracy.

According to an embodiment of the invention, the detector arrangement comprises a chamber, which is preferably hermetic. The chamber can contain gas or a vacuum can be arranged inside the chamber.

According to an embodiment of the invention, the detector arrangement has been arranged in connection with a chamber containing gas. The gas is heated by electromagnetic radiation directed on to it whereby the pressure of the gas rises and the pressure change of the gas causes bending of the sensor.

Radiation can be arranged to enter the chamber, and especially the first part of it, through a window. Radiation can, however, also be arranged to enter the chamber from other directions, e.g. through the walls of the chamber.

According to an embodiment the sensor is arranged inside a chamber or in connection with the chamber frames.

According to an embodiment of the invention the chamber is divided in two parts containing gas, between which two parts the cantilever type sensor is arranged.

According to an embodiment of the invention the inner surface of the chamber walls are made of shiny and/or reflecting material e.g. metal such as gold or aluminum.

According to an embodiment of the invention the absorbing element is the gas in the chamber. Gas can be colored dark for better absorption capacity. The gas can be heated by electromagnetic radiation directed on to it whereby the pressure of the gas rises and the pressure change of the gas causes bending of the sensor.

According to an embodiment of the invention the absorbing element is an absorbing surface. The absorbing surface can be any surface intended to absorb electromagnetic radiation. The absorbing element can also be any other body or a piece of material suitable for absorbing radiation. It can be a black or other dark colored surface, e.g. a sooted surface. The absorbing element can e.g. be made of wool or cotton wool preferably colored dark, e.g. with soot.

According to an embodiment of the invention the absorbing surface is roughened in order to better absorb electromagnetic radiation. It can e.g. be a roughened surface of a piece of glass. According to another embodiment of the invention the absorbing surface is formed by a coating on the first surface of the sensor.

According to an embodiment of the invention the absorbing element is the first surface of the sensor. Electromagnetic radiation can be directed on to this surface whereby a thermal gradient and thereby unequal stress over the cross section of the sensor is generated, causing bending of the sensor. The absorbing element and the sensor can be composed of a single piece of a solid material.

The cantilever sensor can preferably be a door-like element with a frame structure according to the European patent publication EP 1 546 684. The cantilever can e.g. be made of silicon. A cantilever type sensor has several advantages compared to a diaphragm or membrane, e.g. a lower resonance frequency. Its movement and bending is less restricted, which, among other things, contributes to higher sensitivity and linearity and higher dynamic range.

The sensor can also be a diaphragm or a tape.

Detectors can be e.g. photodiodes.

Operational connection of an absorbing element and a sensor means that their operation is interactively linked. For example, the absorbing element and the sensor can be physically combined as one part or they can be separated by a distance in two parts in which case they can e.g. be connected by a gas between them.

According to an embodiment of the invention the detector arrangement has been arranged in connection with a chamber containing gas. An absorbing surface and the sensor are arranged to be separated from each other by a distance in the chamber. The absorbing surface is heated by electromagnetic radiation directed on to it. The heated absorbing surface heats the gas between the absorbing surface and the sensor and thereby raises the pressure of the gas. Pressure change of the gas causes bending of the cantilever sensor.

The light source can be arranged to generate a laser beam or wide band light including UV, visible and IR radiation. According to another embodiment the light source is an LED (Light Emitting Diode). According to yet another embodiment a filament lamp is used. The light beams coming to the detectors are interferences of the light beams coming from the sensor and from the reference mirror.

In this application a mirror means a conventional mirror or any other reflecting means suitable for the purpose.

The reference mirror corresponds to a fixed mirror of a typical Michelson interferometer. According to an embodiment of the invention also the reference mirror can be arranged to be movable, e.g. in order to tilt it.

The beam splitter can be a two-prism block, a semi-transparent mirror or any other means suitable for the purpose. Splitting of a beam by the beam splitter means that one part of the beam is passing through it and one part is reflected from it.

According to a preferred embodiment of the invention the interferometer comprises means for focusing the light beam coming from the light source and split by the beam splitter, essentially on the surface of both the sensor and the reference mirror. These means can be used in the method according to the invention.

In this application, by focusing the light beam essentially on the surface of the sensor and the reference mirror, it is meant that the focus is closer than 2 cm from the surface of the sensor and the reference mirror. According to a preferred embodiment of the invention the focus is arranged closer than 0.5 mm from the surface and according to another preferred embodiment the focus is arranged closer than 0.1 mm from the surface of the sensor and the reference mirror. By the surface of the sensor is meant the reflecting surface of the sensor. However, the focus can be on either side of the surface, on the front side or backside.

When the focuses are essentially on the surface of the sensor and the surface of the reference mirror the small tiltings of these surfaces do not affect the measuring result. The closer to the surfaces the focuses are the greater tilting can be allowed.

According to a preferred embodiment of the invention the means for focusing the light beam comprise at least one optical lens arranged on the path of the light beam. Means for focusing can be arranged in connection with the light source, e.g. between the light source and the beam splitter.

According to an embodiment of the invention the interferometer comprises, in addition to the beam splitter, means for providing a phase difference between different parts of the light beams. These means can be used in the method according to the invention.

Means for providing a phase difference can be an element in which the speed of the light is different than in air or other gas within the interferometer. It can be an at least partly transparent element. It can be a transparent panel or plate of glass or plastic. It can be arranged to be movable, e.g. rotatable. Means for providing a phase difference can be located between the beam splitter and the reference mirror. It can also be located between the beam splitter and the sensor. It can be positioned so that one part of the beam goes through it and the other part passes by it whereby the phase difference is achieved. Means for providing a phase difference can also be a reference mirror, which can be arranged to be tilted.

According to an embodiment at least three beams with a phase difference relative to each other are provided and measured by three detectors.

According to an embodiment at least four beams with a phase difference relative to each other are provided and measured by four detectors.

According to an embodiment the phase difference provided between the light beams is essentially 90 degrees or e.g. 85-95 degrees.

Either a part of the beam going to or a part of the beam coming from the reference mirror or the sensor can be phase shifted with the means for providing a phase difference.

According to an embodiment of the invention the travelling path of a light beam can be provided with two elements, e.g. two glass panels, of which at least one having its position adjustable. It is possible, by adjusting the position of said elements, to provide a phase difference, e.g. 90°, between different parts of the light beam.

Preferably the position of the means for providing the phase difference is adjusted in such a way that as the sensor moves it produces at least two modulated light beams with an optimal 90° phase difference relative to each other. The modulated light beams are measured using at least two detectors. Also other phase differences can be utilized, e.g. 88-92°, 85-95° or 80-100°.

According to a preferred embodiment of the invention the interferometer comprises at least three detectors arranged to receive and measure at least three beams with a phase difference relative to each other. Preferably three beams with a phase difference of 90° relative to each other are provided. Intensity changes and fluctuations of the light source can be compensated in the output signal when three beams with a phase difference are used.

According to another preferred embodiment of the invention the interferometer comprises at least four detectors arranged to receive and measure at least four beams with a phase difference relative to each other. Preferably four beams with a phase difference of 90° relative to each other are provided. All of the light energy from the light source can be utilized when four detectors are used. Also the intensity changes and fluctuations of the light source can be compensated when four detectors are used.

According to an embodiment of the invention the interferometer comprises an array of detectors comprising more than four, preferably more than one hundred, more preferably more than one thousand, e.g. 1024 detectors.

According to an embodiment of the invention the interferometer is adjusted in such a way that the light source is set relative to the beam splitter at an angle other than a 45-degree angle. Thereby the light beam reflecting from both the sensor and from the reference mirror, the focus of which beam is essentially on the sensor and on the reference mirror, does not return along precisely the same path, but, instead, there is a small angle between the outbound light beam and inbound light beam. By the mentioned angle it is meant the angle between the line of the beam from the light source and the plane of the beam splitter.

According to an embodiment of the invention the angle between the light source and the beam splitter is 45°. According to another embodiment the angle is 40-50°, and according to yet another embodiment the angle is 20-70°.

According to an embodiment of the invention the detector arrangement comprises an analog-to-digital converter for converting the analog electrical signals from the detectors into digital signals. According to another embodiment it also comprises means for processing the digital signal. Digital signal processing is used to produce a digital output signal that is proportional to the displacement of the sensor.

The detector arrangement according to the invention has many benefits, e.g. a clearly better sensitivity than Golay cell. The sensitivity is in the same range as for helium-cooled bolometers. However, the detector according to the invention operates in room temperature. The dynamic measurement range is significantly greater than in Golay cell and the response is highly linear. The calibration of the detector arrangement is simple and the response is very stable. The response as a function of the wavelength is flat, as in Golay cell, over extremely wide wavelength region starting from UV to microwave region.

The arrangement and method according to this invention can be used e.g. in thermal imaging and as a detector in optical or infrared spectrometers such as FTIR spectrometers.

DESCRIPTION OF THE PREFERRED EMBODIMENTS

Figure 1:
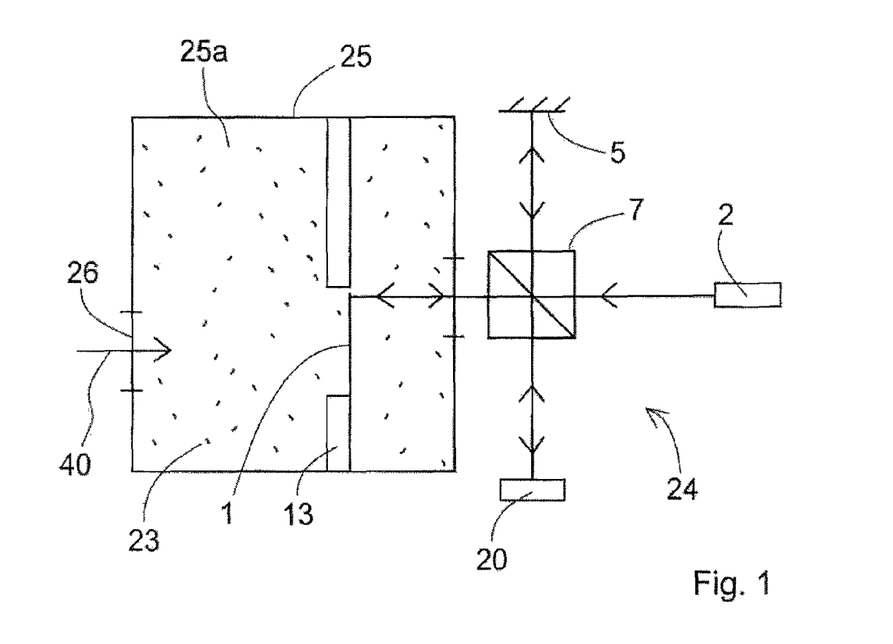
FIG. 1 shows a detector arrangement according to a first embodiment of the invention.

FIG. 1 shows a detector arrangement according to a first embodiment of the invention. Electromagnetic radiation 40 is led into a first part 25a of a chamber 25 through a window 26 and is directed on to the absorbing element, which is the gas 23 in the chamber. Gas 23 in the first part 25a of the chamber 25 is heated by radiation 40 whereby the pressure of the gas 23 rises. Pressure change of the gas 23 causes bending of a sensor 1, which bending is measured with a Michelson type interferometer 24, which comprises e.g. a light source 2, a beam splitter 7, a reference mirror 5 and detectors 20. Sensor 1 is a door-like cantilever, e.g. a flap made of silicon, attached to one side of a frame 13.

Figure 2:
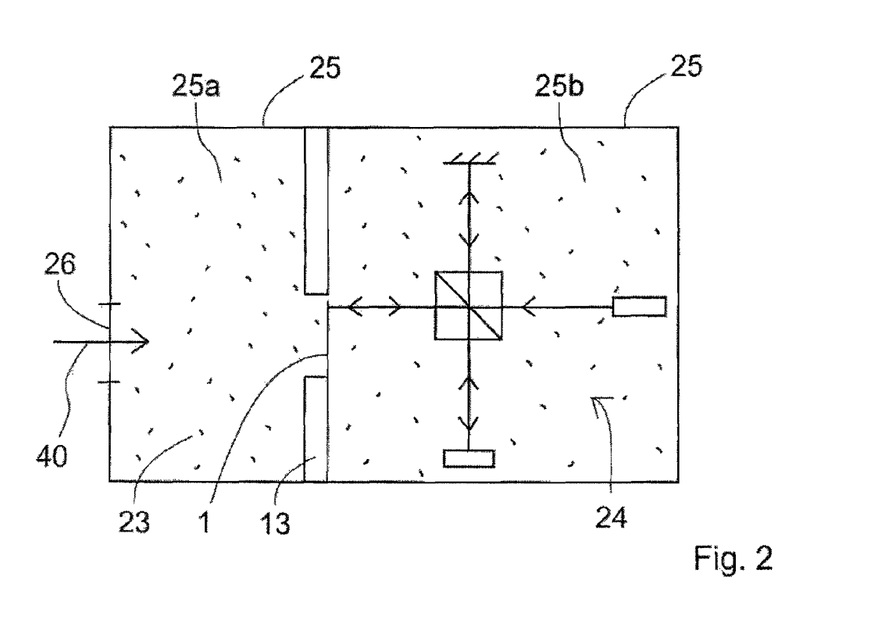
FIG. 2 shows a similar arrangement as in FIG. 1 but the interferometer is arranged inside a second part of the chamber.

FIG. 2 shows a similar arrangement as in FIG. 1 but the interferometer 24 is arranged inside the second part 25b of the chamber 25.

Figure 3:
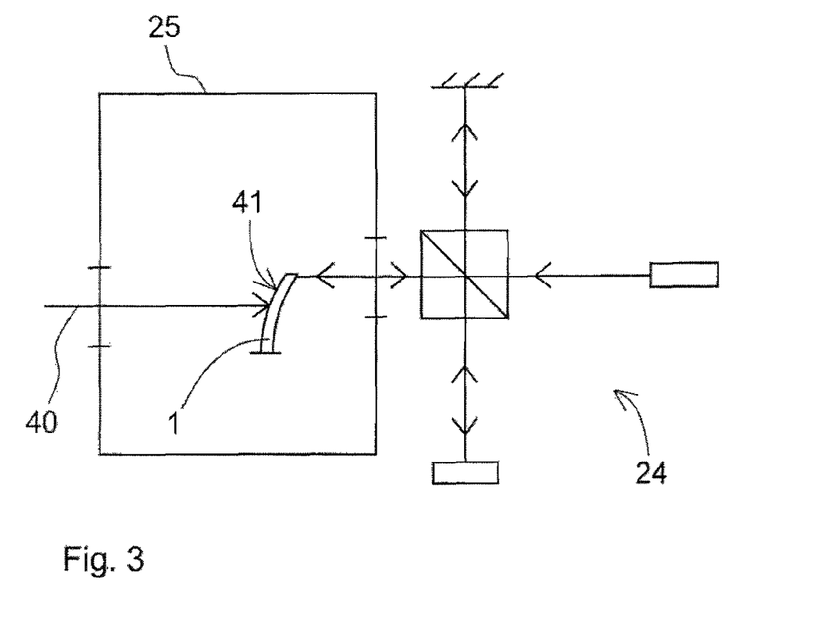
FIG. 3 shows a detector arrangement according to a third embodiment of the invention.

FIG. 3 shows a detector arrangement according to a third embodiment of the invention. A cantilever type sensor 1 is arranged in a chamber 25 in which a vacuum is arranged. The chamber can also contain gas. Electromagnetic radiation 40 is directed on to the first surface 41 of the sensor 1, which is the absorbing element in this embodiment. Radiation 40 generates a thermal gradient and thereby unequal stress over the cross section of the sensor 1, causing bending of the sensor, which is measured with an interferometer 24.

Figure 4:
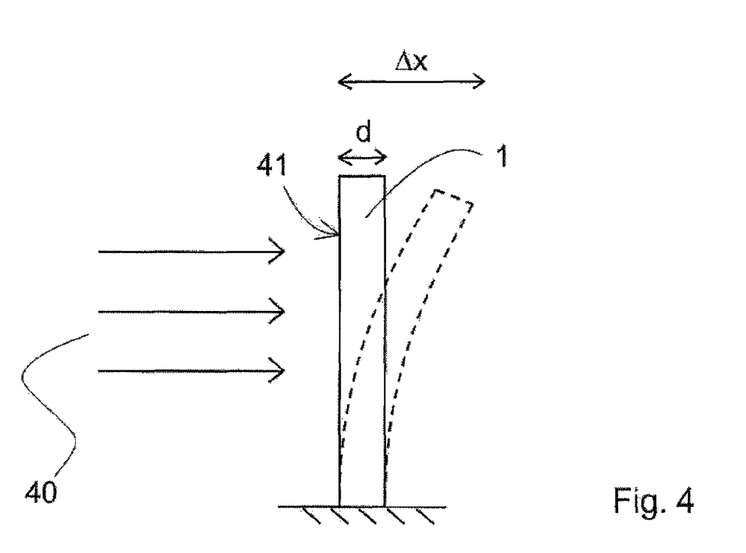
FIG. 4 shows an example of a cantilever type sensor.

FIG. 4 shows an example of a cantilever type sensor 1, a first surface 41 of which is exposed to electromagnetic radiation 40. The temperature of the sensor 1 increases due to absorption of this optical energy whereby a thermal gradient, which is generated over the cross-section d of the sensor 1 forces the sensor 1 to bend as shown in the figure with a broken line. In this example bending of the cantilever sensor is marked with Δx.

Figure 5:
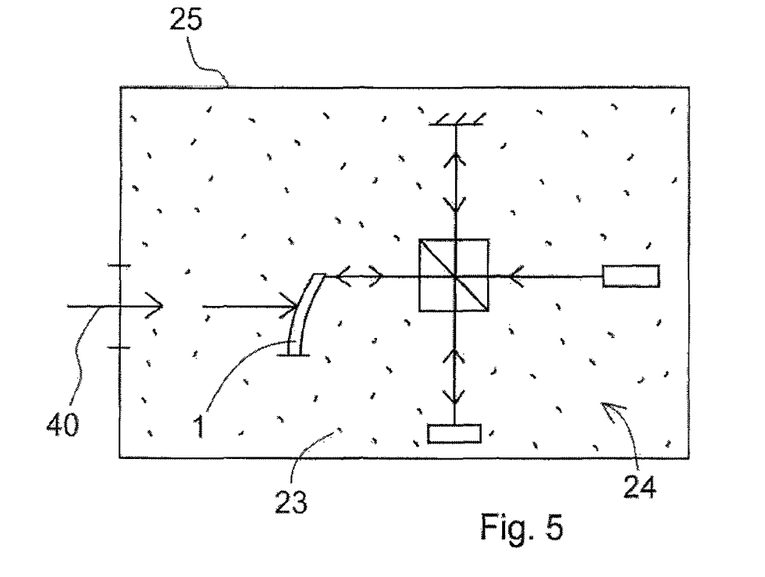
FIG. 5 shows a similar arrangement as FIG. 3 but the interferometer is inside the chamber which contains gas.

FIG. 5 shows a similar arrangement as FIG. 3 but the interferometer 24 is arranged inside the chamber 25 and the chamber contains gas 23 instead of vacuum.

Figure 6:
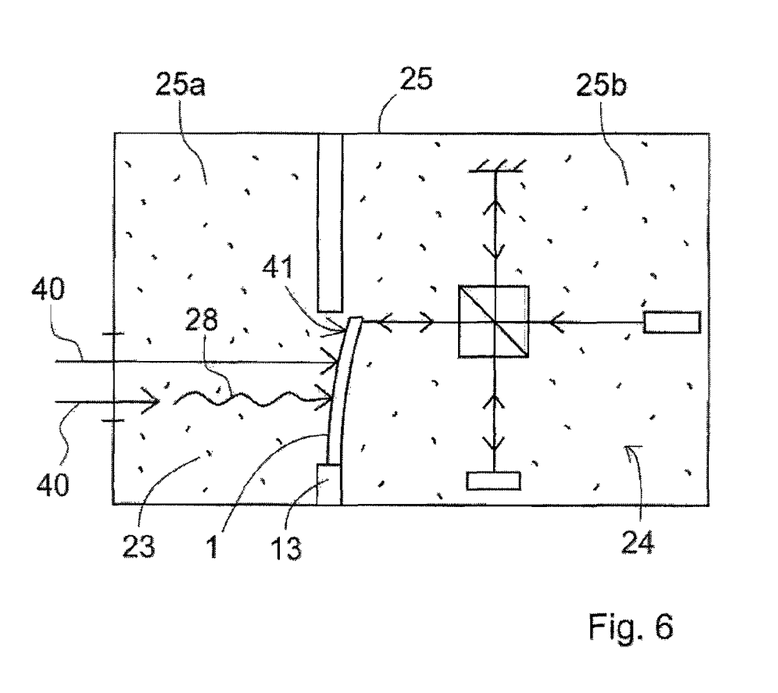
FIG. 6 shows a detector arrangement according to a sixth embodiment of the invention.

FIG. 6 shows a detector arrangement according to a sixth embodiment of the invention. Electromagnetic radiation 40 is directed both on the gas 23 in the first part 25a of the chamber 25 and on to the first surface 41 of the sensor 1, which both are absorbing elements in this embodiment. Radiation 40 heats the gas in the first part 25a of the chamber 25 and raises its pressure. Pressure change of the gas 23, which is depicted by the arrow 28, causes bending of the sensor 1. At the same time, radiation 40 is directed directly on to the first surface 41 of the sensor 1 whereby it generates a thermal gradient and thereby unequal stress over the cross section of the sensor, causing bending of the sensor.

Figure 7:
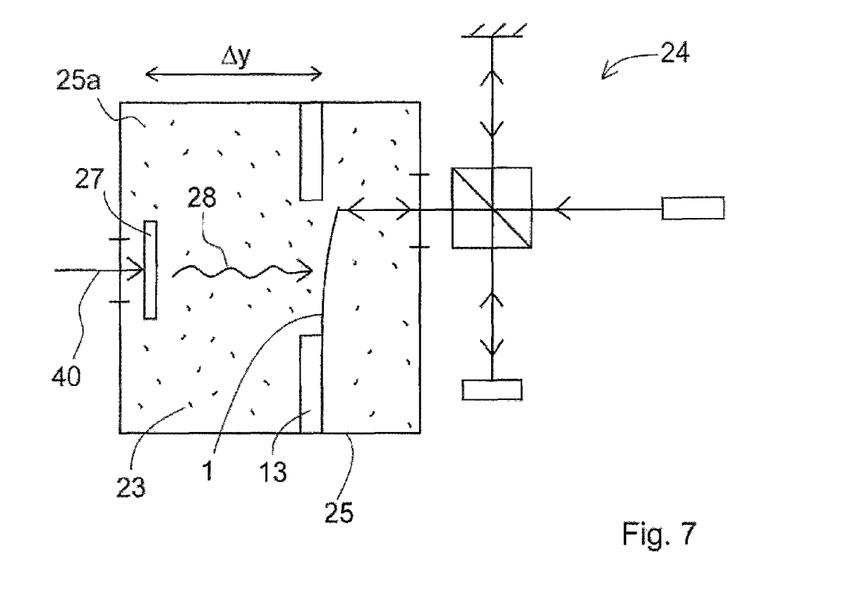
FIG. 7 shows a detector arrangement according to a seventh embodiment of the invention.

FIG. 7 shows a detector arrangement according to a seventh embodiment of the invention. Absorbing element is an absorbing surface 27, preferably with a dark color, and it is arranged in a first part 25a of a hermetic gas chamber 25. The absorbing surface 27 and the sensor 1 are separated from each other by a distance Δy but arranged in operational connection with each other. The absorbing surface 27 is heated by electromagnetic radiation 40 directed on to it. The heated absorbing surface 27 heats the gas 23 in the first part 25a of the chamber 25 and thereby raises the pressure of the gas 23. Pressure change of the gas 23, which is depicted by the arrow 28, causes bending of the sensor 1, which bending is measured with an interferometer 24.

Figure 8:
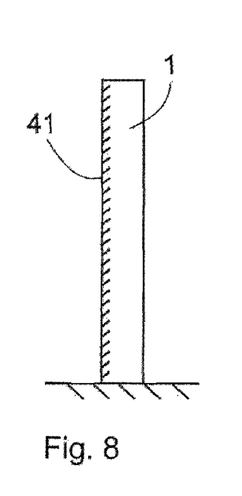
FIG. 8 shows an example of a sensor.

FIG. 8 shows an example of a sensor 1, which is formed of one homogenous material of essentially constant coefficient of thermal expansion. For improving the absorption of electromagnetic radiation the first surface 41 of the sensor 1 is colored dark, e.g. with soot, which is depicted by small diagonal lines.

Figure 9A:
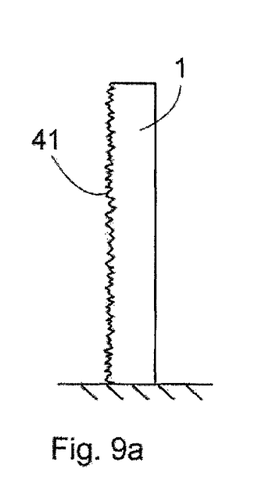
FIG. 9a shows an example of a sensor.
Figure 9B:
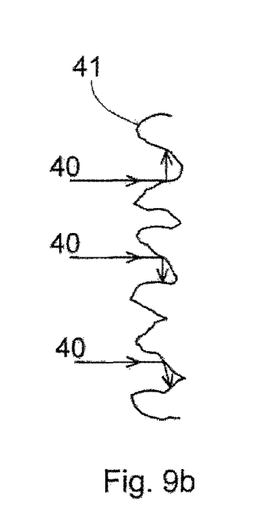
FIG. 9b shows how the electromagnetic rays are reflected within the rugged surface.

FIG. 9a shows an example of a sensor 1, the first surface 41 of which is roughened in order to achieve a good absorption of electromagnetic radiation. Preferably the surface is of a dark color. FIG. 9b shows an enlarged picture of how the electromagnetic rays 40 are reflected within the rugged surface 41 of FIG. 9a. Roughened surface and dark color of the sensor can be used e.g. in the absorbing surface 27 of FIG. 7 and in the sensor 1 of FIGS. 5 and 6.

Figure 10:
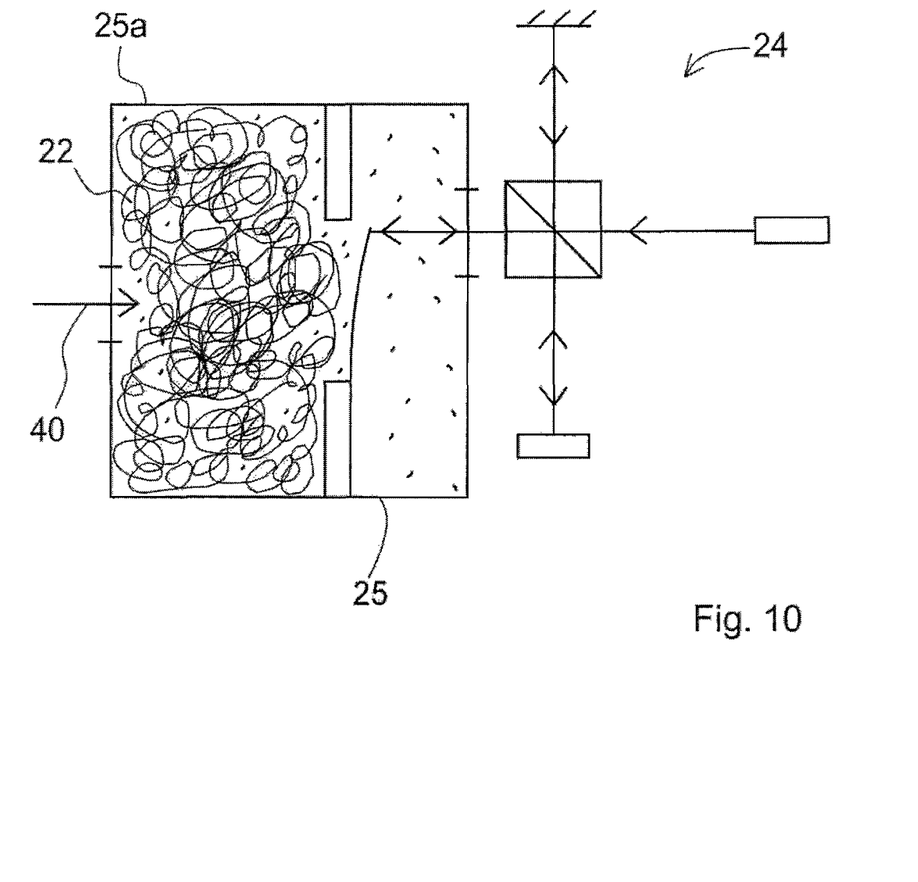
FIG. 10 shows an arrangement according to a tenth embodiment of the invention.

FIG. 10 shows a detector arrangement according to a tenth embodiment of the invention. As an absorbing element is used dark colored cotton wool 22 arranged to fill a major part of the first part 25a of the chamber 25, which embodiment is very good and can be used with different embodiments of the present invention. Cotton wool 22 efficiently absorbs radiation and is thereby heated by electromagnetic radiation 40 directed on to it. Cotton wool 22 then heats the gas 23 in the first part 25a of the chamber 25 and thereby the pressure of the gas 23 is raised, which causes bending of the sensor 1.

Figure 11:
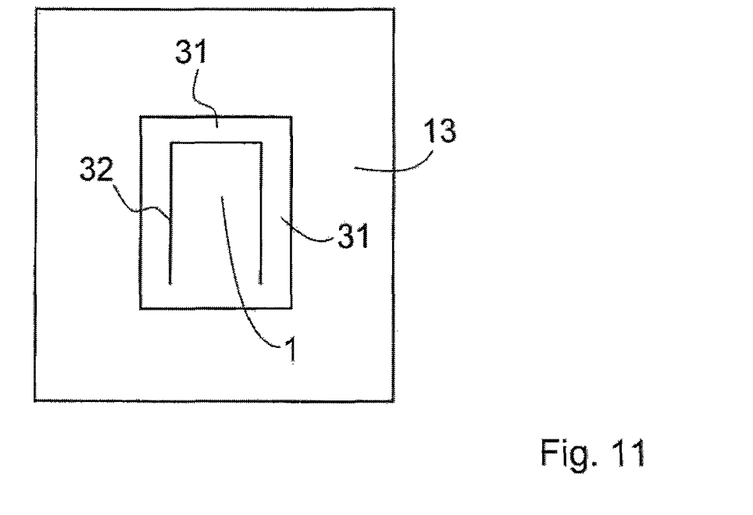
FIG. 11 shows an example of a door-like cantilever sensor.

FIG. 11 shows an example of a cantilever sensor 1, which is a door-like element attached to a frame 31. The cantilever 1 and the frame 31 immediately around it are made of a thin and flexible material, e.g. with a thickness of 5-10 micrometers. The outer part of the frame 13 is in this example made of thicker material, e.g. with a thickness of 400-600 or about 500 micrometers. Reference number 32 points to a slit between the door-like cantilever 1 and the frame 31 around it.

Figure 12:
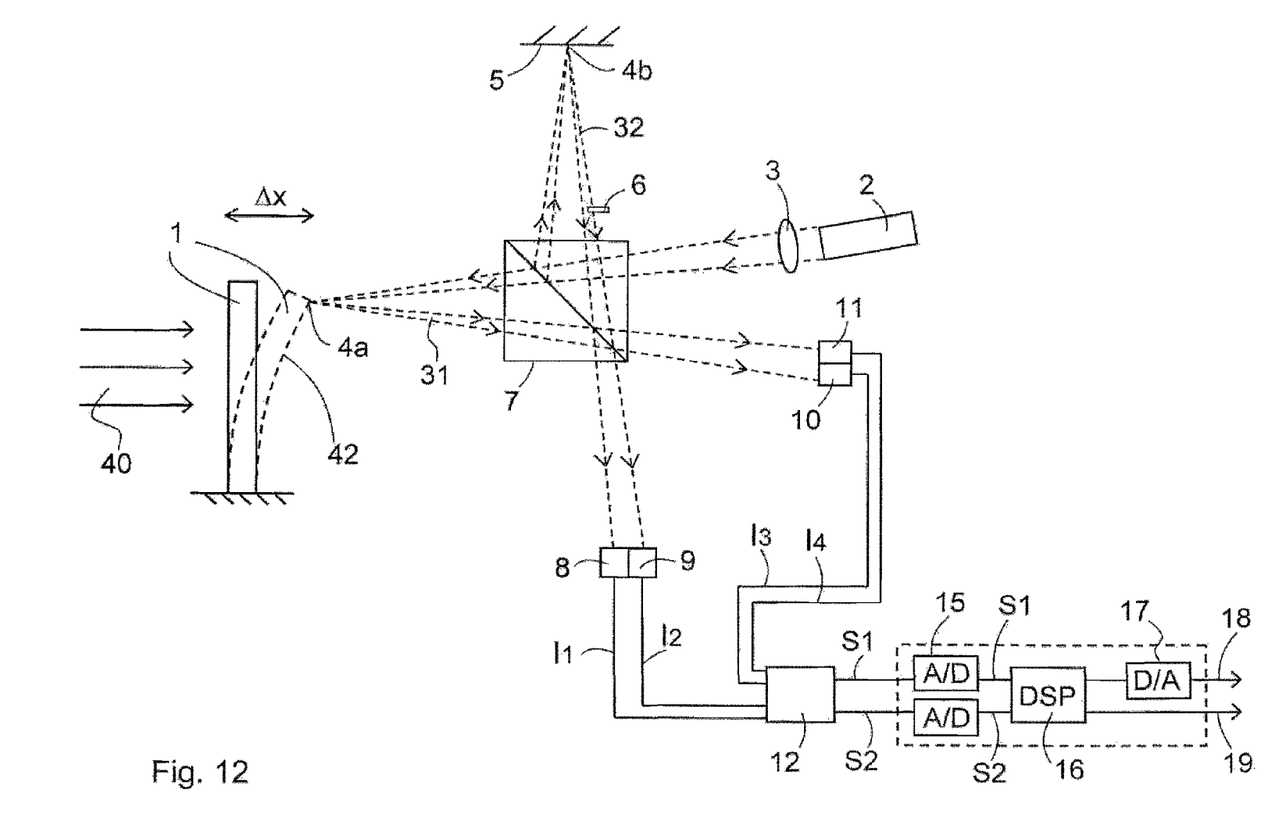
FIG. 12 shows schematically a detector arrangement according to an eleventh embodiment of the invention.

FIG. 12 shows schematically a detector arrangement according to an eleventh embodiment of the invention. The detector arrangement comprises a cantilever sensor 1, which is arranged to be bendable in response to electromagnetic radiation 40. The sensor 1 functions as a moving mirror in a Michelson type interferometer arrangement, which is used for measuring the bending Δx of the sensor. In this embodiment the light source 2 is set relative to the plane of a beam splitter 7 at an angle of about 50-55°. The light beams reflecting from both the reflecting surface 42 of the sensor 1 and from the reference mirror 5 do not return along precisely the same path but, instead, there is an angle between the outbound light beam and inbound light beam. An optical lens 3 arranged between the light source 2 and the beam splitter 7 is used for focusing the light beams 4a, 4b on the surface of the sensor 1 and the reference mirror 5.

In the embodiment of FIG. 12, two detectors 8, 9, which constitute a double detector, are adapted to measure the interference of a light beam 31 returning from the sensor 1 and reflected from the beam splitter 7, and a light beam 32 returning from the reference mirror 5 and passing through the beam splitter 7. Two more detectors 10, 11, which are preferably placed in the proximity of the light source 2, are adapted to measure the light beam 31 returning from the sensor 1 and passing through the beam splitter 7, and the light beam 32 reflected from the reference mirror 5 and the beam splitter 7.

In this example a glass panel 6 is located between the reference mirror 5 and the beam splitter 7 so that one part of the beam 32 reflected from the reference mirror 5 goes through the glass panel 6 and the other part passes it. The glass panel can be adjusted, e.g. rotated so that a phase difference between the two parts of the beam is achieved.

The electric signals from the detectors 8, 9, 10, 11 are given by $$I_1 = B(1 + \cos \varnothing)$$

$$I_2 = B(1 + \sin \varnothing)$$

$$I_3 = B(1 - \sin \varnothing)$$

$$I_4 = B(1 - \cos \varnothing)$$

where B is the laser intensity and $\varnothing = 4\pi \Delta x / \lambda$.

These electric signals are processed in the analog form in analog electronics 12 to form two signals $S_1$ and $S_2$ given by $$S_1 = I_2 - I_3 = 2B \sin \varnothing$$

$$S_2 = I_1 - I_4 = 2B \cos \varnothing$$

Then the analog signals $S_1$ and $S_2$ are converted to digital signals with A/D converters 15. The digital signals $S_1$ and $S_2$ are further digitally processed with a means of DSP 16 in order to obtain the output signal 19 proportional to the bending of the sensor:

$$\Delta x = (\lambda / 4\pi) \arctan(S_1 / S_2)$$

In case an analog output signal 18 is needed a D/A converter 17 can be used.

There is no intention to limit the invention to the foregoing embodiments, but it can be varied within the scope of the inventive concept set forth in the claims.

I claim:

1. A detector arrangement for electromagnetic radiation, comprising at least:
   an absorbing surface for absorbing optical energy of electromagnetic radiation; and
   a sensor, comprising a first surface and a reflecting surface, the absorbing surface and the sensor being arranged in operational connection with each other by way of a quantity of gas, held in a chamber which contains the absorbing surface, the quantity of gas engaging the sensor, and at least the sensor being arranged to be bendable in response to a change in gas pressure in the chamber resulting from electromagnetic radiation absorbed by the absorbing surface, wherein the arrangement further comprises an interferometer for measuring bending of the sensor, which is a cantilever; and wherein the absorbing surface and the sensor are arranged separated from each other by a distance.

2. The detector arrangement according to claim 1, wherein:
the interferometer is a Michelson type interferometer, which comprises at least a light source, a reference mirror, a beam splitter, and at least two detectors; and a moving mirror of a Michelson interferometer is formed by the reflecting surface of the sensor.

3. The detector arrangement according to claim 2, wherein the interferometer comprises means for focusing the light beam, coming from the light source and split by the beam splitter, essentially on the surface of both the sensor and the reference mirror.

4. The detector arrangement according to claim 2, wherein the interferometer comprises, in addition to the beam splitter, means for providing a phase difference between different parts of the light beams.

5. The detector arrangement according to claim 4, wherein the interferometer comprises at least three detectors arranged to receive and measure at least three beams with a phase difference relative to each other.

6. The detector arrangement according to claim 4, wherein the interferometer comprises at least four detectors arranged to receive and measure at least four beams with a phase difference relative to each other.

7. The detector arrangement according to claim 1, wherein the interferometer comprises an array of detectors comprising more than four, preferably more than one hundred, more preferably more than one thousand detectors.

8. The detector arrangement according to claim 1, wherein the absorbing surface is dark coloured cotton wool arranged to fill a major part of the chamber.

9. A method for measuring electromagnetic radiation, comprising the following steps:
arranging an absorbing surface and a sensor arranged separated from each other by a distance and in operational connection with each other, the sensor comprising a first surface and a reflecting surface, and arranging at least the sensor to be bendable in response to electromagnetic radiation;
directing electromagnetic radiation on to the absorbing surface and thereby causing bending of the sensor;
measuring bending of the cantilever type sensor with an interferometer;
wherein the detector arrangement has been arranged in connection with a chamber containing gas, and the absorbing surface and the sensor are arranged in the chamber;
heating the absorbing surface with electromagnetic radiation directed on to the absorbing surface;
heating the gas with the heat absorbing surface and so raises the pressure of the gas, and the pressure change of the gas causes bending of the sensor.

10. The method according to claim 9, wherein bending of the sensor is measured with a Michelson type interferometer, measuring comprising at least the following steps:
generating a light beam by a light source;
splitting the light beam for the reflecting surface of the sensor and for a reference mirror by a beam splitter and reflecting the split beams from the sensor and the reference mirror back to the beam splitter, and further to at least two detectors; and
receiving the light beams coming from the sensor and the reference mirror via the beam splitter and converting the received beams into electric signals by the detectors.

* * * * *